(12) United States Patent
Kim

(10) Patent No.: US 10,953,893 B2
(45) Date of Patent: Mar. 23, 2021

(54) VEHICLE CONTROL APPARATUS AND VEHICLE CONTROL METHOD

(71) Applicant: Mando-Hella Electronics Corporation, Incheon (KR)

(72) Inventor: Shinwook Kim, Seoul (KR)

(73) Assignee: MANDO-HELLA ELECTRONICS CORPORATION, Incheon (KR)

(*) Notice: Subject to any disclaimer, the term of this patent is extended or adjusted under 35 U.S.C. 154(b) by 505 days.

(21) Appl. No.: 15/838,185

(22) Filed: Dec. 11, 2017

(65) Prior Publication Data
US 2019/0009795 A1  Jan. 10, 2019

(30) Foreign Application Priority Data
Jul. 7, 2017  (KR) .......................... 10-2017-0086210

(51) Int. Cl.
*B60W 50/14* (2020.01)
*B60W 30/09* (2012.01)
*B60W 40/04* (2006.01)
*B60W 40/09* (2012.01)

(52) U.S. Cl.
CPC ............ *B60W 50/14* (2013.01); *B60W 30/09* (2013.01); *B60W 40/04* (2013.01); *B60W 40/09* (2013.01); *B60W 2555/60* (2020.02); *B60W 2720/10* (2013.01)

(58) Field of Classification Search
CPC ...... B60W 50/14; B60W 30/09; B60W 40/04; B60W 40/09; B60W 2555/60; B60W 2720/10; B60W 30/16; B60T 7/12

USPC .......................................................... 701/301
See application file for complete search history.

(56) References Cited

U.S. PATENT DOCUMENTS

| | | | | |
|---|---|---|---|---|
| 2002/0019703 A1* | 2/2002 | Levine | .................... | G08G 1/205 |
| | | | | 701/301 |
| 2011/0093162 A1* | 4/2011 | Nielsen | .............. | G06Q 10/0631 |
| | | | | 701/31.4 |
| 2011/0193693 A1* | 8/2011 | Filev | ..................... | B60W 50/16 |
| | | | | 340/435 |

FOREIGN PATENT DOCUMENTS

KR  10-1500010  3/2015

* cited by examiner

*Primary Examiner* — Anne Marie Antonucci
*Assistant Examiner* — Andrew J Cromer
(74) *Attorney, Agent, or Firm* — Ladas & Parry, LLP

(57) ABSTRACT

Disclosed are a vehicle control apparatus and a vehicle control method. The vehicle control apparatus according to an embodiment of the present disclosure includes an input unit to receive current lane information, current traffic sign information, and current driver behavior information photographed by a photographing apparatus, a determination unit to determine whether a vehicle is in an inappropriate driving pattern based on the inputted current lane information and the current traffic sign information and to determine whether a driver is in a driver carelessness state based on the inputted current driver behavior information, and a controller to transmit a warning command to a warning apparatus so that the warning apparatus warns the driver that the driver is currently in a careless driving state if the vehicle is in the inappropriate driving pattern and the driver is in the driver carelessness state.

10 Claims, 15 Drawing Sheets

| FREQUENCY OF OCCURRENCE OF INAPPROPRIATE DRIVING PATTERN | FIRST WEIGHTED VALUE |
|---|---|
| 0 TIMES | 1.0 |
| 1 TIME | 0.9 |
| 2 TIMES | 0.8 |
| 3 TIMES | 0.7 |
| MORE THAN 4 TIMES | 0.6 |

FIG. 3

| INAPPROPRIATE DRIVING PATTERN | FEATURE | PATTERN EXAMPLE |
|---|---|---|
| (A): ZIGZAG DRIVING | INCREASE IN LATERAL POSITION CHANGE IN LANE | |
| (B): SURROUNDING LANE CROSSING | RETURNING TO ORIGINAL LANE AFTER CROSSING ADJACENT LANE | |
| (C): SUDDEN STEERING VEERING | SUDDENLY LARGE STEERING PATTERN | |
| (D): LANE TRACKING FAILURE | DECREASE IN STEERING WHEEL GRIPPING FORCE DUE TO DROWSINESS DRIVING | |
| (E): VEHICLE SPEED KEEPING FAILURE | VEHICLE SPEED KEEPING FAILURE DUE TO CARELESSNESS STATE | |

FIG. 5

| FREQUENCY OF OCCURRENCE OF INAPPROPRIATE DRIVING PATTERN | FIRST WEIGHTED VALUE |
|---|---|
| 0 TIMES | 1.0 |
| 1 TIME | 0.9 |
| 2 TIMES | 0.8 |
| 3 TIMES | 0.7 |
| MORE THAN 4 TIMES | 0.6 |

FIG. 6

| FREQUENCY OF WARNING OCCURRENCE | SECOND WEIGHTED VALUE |
|---|---|
| 0 TIMES | 1.0 |
| 1 TIME | 0.9 |
| 2 TIMES | 0.8 |
| 3 TIMES | 0.7 |
| MORE THAN 4 TIMES | 0.6 |

VEHICLE CONTROL APPARATUS AND VEHICLE CONTROL METHOD

CROSS-REFERENCE TO RELATED APPLICATION(S)

This application claims the benefit of Korean Patent Application No. 2017-0086210, filed on Jul. 7, 2017 in the Korean Intellectual Property Office, the disclosure of which is incorporated herein by reference.

BACKGROUND

1. Technical Field

The present disclosure relates to a vehicle control apparatus and a vehicle control method.

2. Description of the Related Art

Generally, conventional driver carelessness warning apparatuses were provided to sense and warn of a driver's carelessness state such as fatigue or drowsiness driving according to the driver's long-time driving.

For example, as described in Korean Patent Registration No. 10-1500010 (Mar. 2, 2015), there was disclosed a driver drowsiness and fatigue sensing system which can properly warn a driver exposed to a dangerous situation by sensing drowsiness or fatigue using the drivers state and the drivers response characteristics.

However, the conventional driver drowsiness and fatigue sensing system has limitations in efficiently improving the warning operation of a warning apparatus, in reducing a false warning rate while warning that a driver is currently in a careless driving state within a proper time, and in effectively preventing the occurrence of a traffic accident in advance.

Therefore, in recent years, research on an improved vehicle control apparatus and an improved vehicle control method for efficiently improving the warning operation of a warning apparatus, reducing a false warning rate while warning that a driver is currently in a careless driving state within a proper time, and effectively preventing the occurrence of a traffic accident in advance have been continuously carried out.

SUMMARY

It is an aspect of the present disclosure to provide a vehicle control apparatus and a vehicle control method capable of efficiently improving a warning operation of a warning apparatus.

Further, it is an aspect of the present disclosure to provide a vehicle control apparatus and a vehicle control method capable of reducing a false warning rate while warning that a driver is currently in a careless driving state within a proper time.

Further, it is an aspect of the present disclosure to provide a vehicle control apparatus and a vehicle control method capable of effectively preventing the occurrence of a traffic accident in advance.

Additional aspects of the present disclosure will be set forth in part in the description which follows and, in part, will be obvious from the description, or may be learned by practice of the disclosure.

In accordance with an aspect of the present disclosure, there may be provided a vehicle control apparatus including an input unit to receive current lane information, current traffic sign information, and current driver behavior information photographed by a photographing apparatus, a determination unit to determine whether a vehicle is in an inappropriate driving pattern based on the inputted current lane information and the current traffic sign information and to determine whether a driver is in a driver carelessness state based on the inputted current driver behavior information, and a controller to transmit a warning command to a warning apparatus so that the warning apparatus warns the driver that the driver is currently in a careless driving slate if the vehicle is in the inappropriate driving pattern and the driver is in the driver carelessness state.

In accordance with an aspect of the present disclosure, the controller may further count the frequency of occurrence of the inappropriate driving pattern for a predetermined time if it is determined that the vehicle is in a state in which the inappropriate driving pattern has started to occur and further calculate and update a driver carelessness state determination rime for performing the warning operation of the warning apparatus using the inappropriate driving pattern counted for the predetermined rime and the frequency of warning occurrence of the warning apparatus for the predetermined time, and may further transmit a warning command to the warning apparatus so as to warn the driver of the warning operation of the warning apparatus if the duration of the driver carelessness state is greater than the calculated driver carelessness state determination time.

In accordance with an aspect of the present disclosure, the driver carelessness state determination time may be calculated using an initial driver carelessness state determination time set to an initial default value of the controller, a first weighted value applied in correspondence with the frequency of occurrence of the inappropriate driving pattern for the predetermined rime, and a second weighted value applied in correspondence with the frequency of warning occurrence of the warning apparatus for the predetermined time.

In accordance with an aspect of the present disclosure, the controller may further transmit a vehicle attitude control command to an electronic stability control (ESC) apparatus so that the ESC apparatus controls the vehicle attitude in accordance with the lane if the vehicle is in the inappropriate driving pattern and the driver is in the driver carelessness state.

In accordance with an aspect of the present disclosure, the controller may further transmit a speed regulation command to a speed regulation apparatus so that the speed regulation apparatus regulates the speed in accordance with a target speed if the vehicle is in the inappropriate driving pattern and the driver is in the driver carelessness state.

In accordance with an aspect of the present disclosure, the controller may further transmit a speed regulation command to a speed regulation apparatus so that the speed regulation apparatus regulates the speed in accordance with a regulation speed of the inputted current traffic sign information if the vehicle is in the inappropriate driving pattern and the driver is in the driver carelessness state.

In accordance with another aspect of the present disclosure, there may be provided a vehicle control method including steps of receiving current lane information, current traffic sign information, and current driver behavior information photographed by a photographing apparatus, determining whether a vehicle is in an inappropriate driving pattern based on the inputted current lane information and the current traffic sign information and determining whether a driver is in a driver carelessness state based on the inputted current driver behavior information, and transmitting a warning command to a warning apparatus so that the warning apparatus warns the driver that the driver is currently in the careless driving state if the vehicle is in the inappropriate driving pattern and the driver is in the driver carelessness state.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a diagram illustrating a process of determining whether a vehicle is in an inappropriate driving pattern through a determination unit shown in FIG. 2;

FIG. 5 is a diagram illustrating a lookup table of first weighted values applied in correspondence with the frequency of occurrence of inappropriate driving patterns for a predetermined time in the controller shown in FIGS. 2 and 4;

FIG. 6 is a diagram illustrating a lookup table of second weighted values applied in correspondence with the frequency of warning occurrence of the warning apparatus for a predetermined time in the controller shown in FIGS. 2 and 4;

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
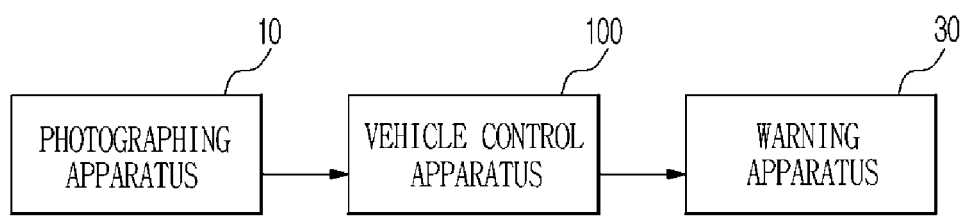
FIG. 1 is a block diagram illustrating a state in which a vehicle control apparatus according to an embodiment of the present disclosure is connected to a photographing apparatus and a warning apparatus.
Figure 2:
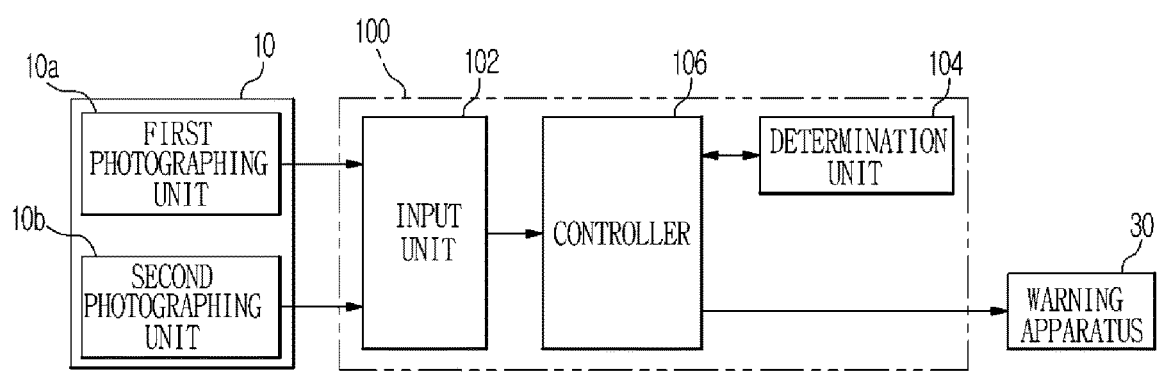
FIG. 2 is a block diagram illustrating an example of the photographing apparatus and the vehicle control apparatus shown in FIG. 1.

FIG. 1 is a block diagram illustrating a state in which a vehicle control apparatus according to an embodiment of the present disclosure is connected to a photographing apparatus and a warning apparatus, and FIG. 2 is a block diagram illustrating an example of the photographing apparatus and the vehicle control apparatus shown in FIG. 1.

Figure 4:
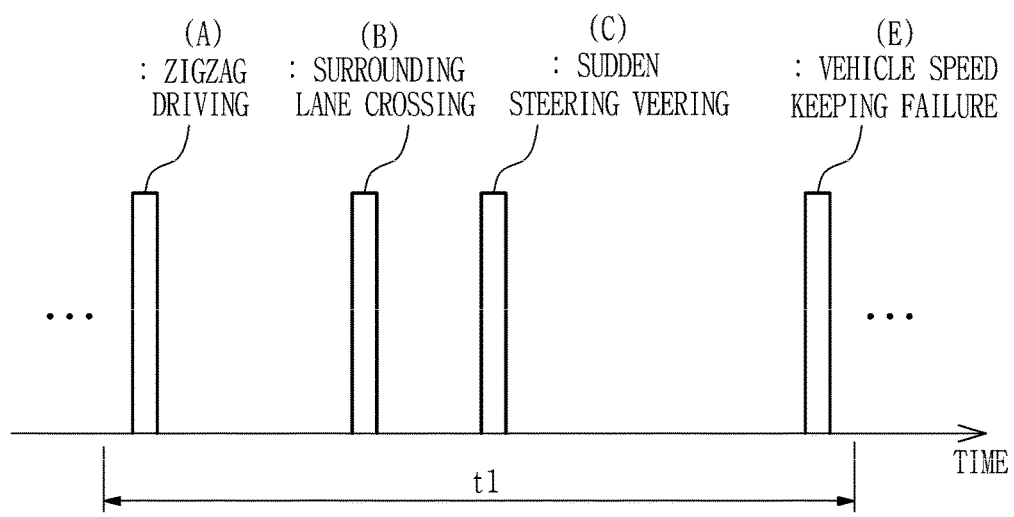
FIG. 4 is a diagram illustrating a process of counting an inappropriate driving pattern for a predetermined time through a controller shown in FIG. 2.

FIG. 3 is a diagram illustrating a process of determining whether a vehicle is in an inappropriate driving pattern through a determination unit shown in FIG. 2, and FIG. 4 is a diagram illustrating a process of counting an inappropriate driving pattern for a predetermined time through a controller shown in FIG. 2.

FIG. 5 is a diagram illustrating a lookup table of first weighted values applied in correspondence with the frequency of occurrence of inappropriate driving patterns for a predetermined time in the controller shown in FIGS. 2 and 4, and FIG. 6 is a diagram illustrating a lookup table of second weighted values applied in correspondence with the frequency of warning occurrence of the warning apparatus for a predetermined time in the controller shown in FIGS. 2 and 4.

Referring to FIGS. 1 and 2, a vehicle control apparatus 100 according to an embodiment of the present disclosure includes an input unit 102, a determination unit 104, and a controller 106.

The input unit 102 receives current lane information, current traffic sign information, and current driver behavior information photographed by a photographing apparatus 10.

As an example, as shown in FIG. 2, the input unit 102 may receive the current lane information and the current traffic sign information photographed by a first photographing unit 10a of the photographing apparatus 10.

For example, as shown in FIGS. 2 and 3, the input unit 102 may receive the current lane information photographed by the first photographing unit 10a according to a driver's lateral driving change and may receive the current lane information photographed by the first photographing unit 10a in accordance with the driver's lane veering.

Further, the input unit 102 may receive the current lane information photographed by the first photographing unit 10a according to sudden steering veering of the driver and may receive the current lane information photographed by the first photographing unit 10a in accordance with the reduction of a steering wheel gripping force due to the drowsy driving of the driver.

Further, the input unit 102 may receive the regulation speed sign information corresponding to the current traffic sign information photographed by the first photographing unit 10a in accordance with vehicle speed keeping failure due to the driver's carelessness state.

Herein, the first photographing unit 10a may be a camera, and although not shown, may be mounted in front of a vehicle.

As another example, as shown in FIG. 2, the input unit 102 may receive the current driver behavior information photographed by a second photographing unit 10b of the photographing apparatus 10.

For example, as shown in FIGS. 2 and 3, the input unit 102 may receive the current driver behavior information photographed by the second photographing unit 10b in accordance with a forward-looking negligent state.

The forward-looking negligent state may be at least one of a face state, a shoulder state, a movement state and an attitude state of a driver, an open/closed state of the driver's eyes, and a state in which the driver looks at a portable device.

Herein, the second photographing unit 10b may be a camera, and although not shown, may be mounted at a position where a driver's behavior can be photographed in the interior of a vehicle.

The determination unit 104 determines whether a vehicle is in an inappropriate driving pattern according to the control of the controller 106, which will be described later, based on the current lane information and the current traffic sign information inputted to the input unit 102, and determines whether a driver is in a driver carelessness state according to the control of the controller 106 based on the current driver behavior information inputted to the input unit 102.

As an example, as shown in FIG. 3, the inappropriate driving pattern may be at least one of a zigzag driving state A, a surrounding lane crossing state B, a sudden steering veering state C, a lane tracking failure state D, and a vehicle speed keeping failure state E.

The controller 106 transmits a warning command to a warning apparatus 30 to warn the driver that the driver is currently in a careless driving state if the determination unit 104 determines that a vehicle is in an inappropriate driving pattern and the driver is in a driver carelessness state.

In addition, as shown in FIGS. 2 and 4, the controller 106 may further count the frequency of occurrence of the inappropriate driving pattern for a predetermined time t1 if the determination unit 104 determines that the vehicle is in a state in which the inappropriate driving pattern has started to occur.

As an example, if the determination unit 104 determines that the vehicle is in the inappropriate driving pattern, the controller 106 may count at least one of the zigzag driving state A, the surrounding lane crossing state B, the sudden steering veering state C, and the vehicle speed keeping failure state E for the predetermined time t1.

In addition, as shown in FIGS. 2 and 4, the controller 106 may further calculate a driver carelessness state determination time for performing the warning operation of the warning apparatus 30 using the inappropriate driving pattern counted for the predetermined time t1 and the frequency of warning occurrence of the warning apparatus 30 for the predetermined time t1.

As an example, the controller 106 may further calculate a driver carelessness state determination time for performing the warning operation of the warning apparatus 30 using at least one of the zigzag driving state A, the surrounding lane crossing state B, the sudden steering veering state C, and the vehicle speed keeping failure state E counted for the predetermined time t1, which are the inappropriate driving patterns, and using the frequency of warning occurrence of the warning apparatus 30 occurring after the time when the driver starts driving.

The driver carelessness state determination time, as shown in FIGS. 2 and 4 to 6, may be calculated using an initial driver carelessness state determination time set to an initial default value of the controller 106, a first weighted value applied in correspondence with the frequency of occurrence of the inappropriate driving pattern for the predetermined time t1, and a second weighted value applied in correspondence with the frequency of warning occurrence of the warning apparatus 30 for the predetermined time t1.

As an example, the driver carelessness state determination time may be calculated by <Equation 1> below.

$$T_{th} = T_{int} \cdot P_D \cdot N_A \qquad \text{<Equation 1>}$$

Herein, $T_{th}$ may be a driver carelessness state determination time for performing the warning operation of the warning apparatus 30, $T_{int}$ may be an initial driver carelessness state determination time set to an initial default value, $P_D$ may be a first weighted value applied in correspondence with the frequency of occurrence of the inappropriate driving pattern for the predetermined time t1, and $N_A$ may be a second weighted value applied in correspondence with the frequency of warning occurrence of the warning apparatus 30 for the predetermined time t1.

For example, as shown in FIGS. 2 and 4 to 6, if an initial driver carelessness state determination time set to an initial default value is 3 seconds, an inappropriate driving pattern occurs three times within 10 minutes as the predetermined time t1, and a warning occurs twice after the system startup of the vehicle control apparatus, the determination time $T_{th}$ may be calculated as below.

$$T_{th} = T_{int} \cdot P_D \cdot N_A = 3*0.7*0.8 = 1.68 \text{ sec}$$

In addition, if the determination unit 104 determines that the duration of the driver carelessness state is greater than the calculated driver carelessness state determination time, the controller 106 may further transmit a warning command to the warning apparatus 30 so as to warn the driver of the warning operation of the warning apparatus 30.

For example, if the determination unit 104 determines that the duration of the driver carelessness state is greater than 1.68 seconds as the calculated driver carelessness state determination time $T_{th}$, the controller 106 may further transmit a warning command to the warning apparatus 30 so as to warn the driver of the warning operation of the warning apparatus 30.

Herein, the driver carelessness state may be at least one of a face state, a shoulder state, a movement state and an attitude state of a driver, an open/closed state of the driver's eyes, and a state in which the driver looks at a portable device.

Figure 7:
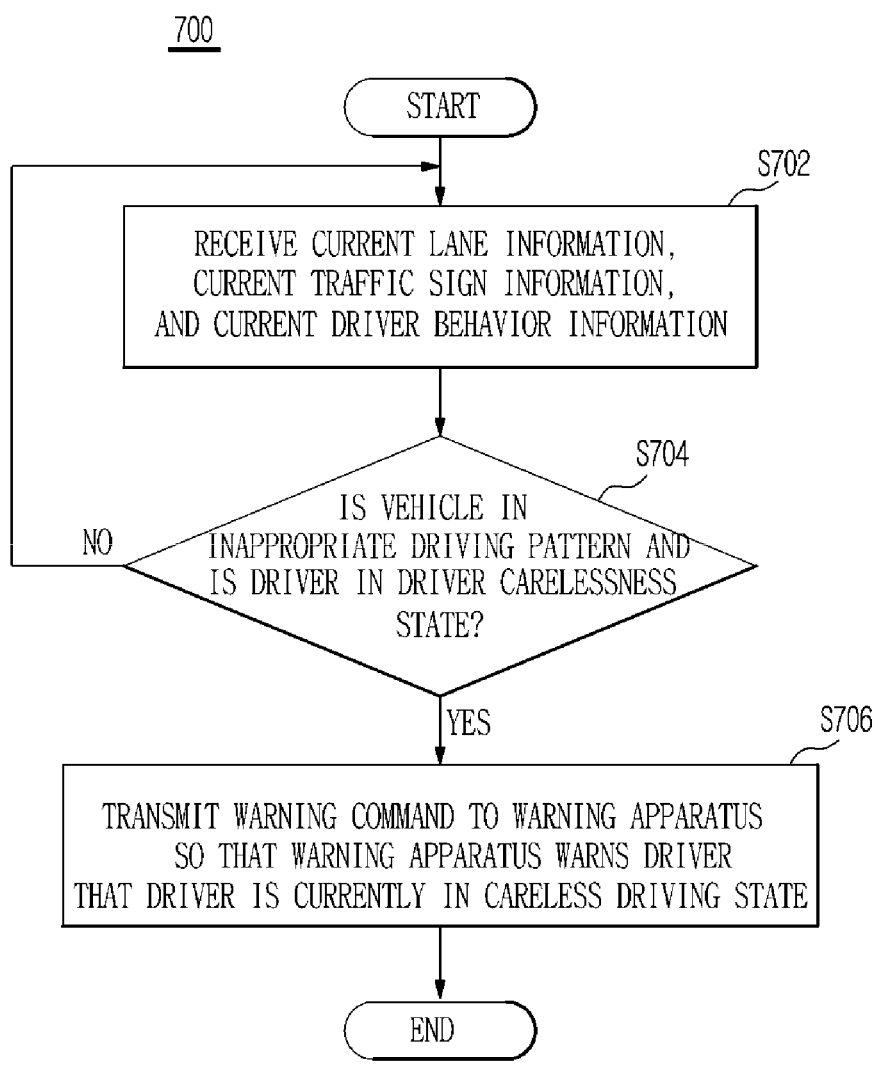
FIG. 7 is a flowchart illustrating an example of a vehicle control method of a vehicle control apparatus according to an embodiment of the present disclosure.
Figure 8:
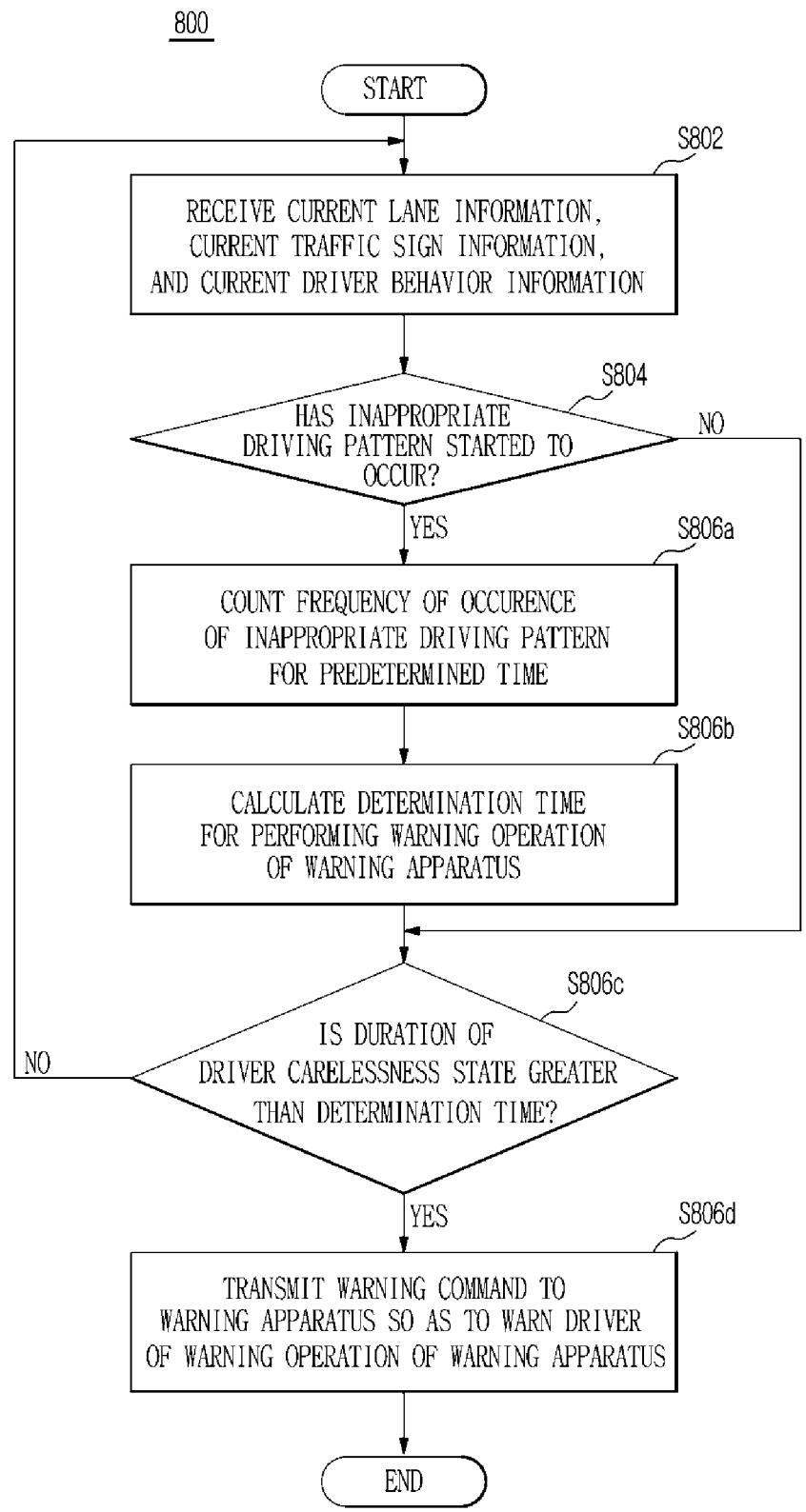
FIG. 8 is a flowchart illustrating another example of a vehicle control method of a vehicle control apparatus according to an embodiment of the present disclosure.

FIG. 7 is a flowchart illustrating an example of a vehicle control method of a vehicle control apparatus according to an embodiment of the present disclosure, and FIG. 8 is a flowchart illustrating another example of a vehicle control method of a vehicle control apparatus according to an embodiment of the present disclosure.

Referring to FIGS. 7 and 8, vehicle control methods 700 and 800 of the vehicle control apparatus 100 (in FIG. 2) according to an embodiment of the present disclosure include first steps S702 and S802, second steps S704 and S804, and third steps S706 and S806a to S806d.

First, in the first steps S702 and S802, the current lane information, the current traffic sign information, and the current driver behavior information photographed by the photographing apparatus 10 (in FIG. 2) are inputted through the input unit 102 (in FIG. 2).

Thereafter, in the second step S704, the determination unit 104 determines whether a vehicle is in an inappropriate driving pattern according to the control of the controller 106 (in FIG. 2) based on the current lane information and the current traffic sign information inputted to the input unit 102 (in FIG. 2), and determines whether a driver is in a driver carelessness state according to the control of the controller 106 (in FIG. 2) based on the current driver behavior information inputted to the input unit 102 (in FIG. 2).

Thereafter, in the third step S706, if the determination unit 104 determines that the vehicle is in an inappropriate driving pattern and the driver is in a driver carelessness state, the controller 106 (in FIG. 2) transmits a warning command to the warning apparatus 30 (in FIG. 2) to warn the driver that the driver is currently in a careless driving state.

In addition, as shown in FIG. 8, in the second step S804, the determination unit 104 according to the control of the controller 106 (in FIG. 2) may determine whether an inappropriate driving pattern has started to occur based on the current lane information and the current traffic sign information inputted to the input unit 102 (in FIG. 2).

Thereafter, in the third step S806a, if the determination unit 104 (in FIG. 2) determines that the vehicle is in a state in which the inappropriate driving pattern has started to occur, the controller 106 (in FIG. 2) may further count the frequency of occurrence of the inappropriate driving pattern for the predetermined time t1 (in FIG. 4).

Thereafter, in the third step S806b, the controller 106 (in FIG. 2) may further calculate the driver carelessness state determination time for performing the warning operation of the warning apparatus 30 (in FIG. 2) using the inappropriate driving pattern counted for the predetermined time t1 (in FIG. 4) and the frequency of warning occurrence of the warning apparatus 30 (in FIG. 2) for the predetermined time t1.

Thereafter, in the third steps S806c and S806d, if the determination unit 104 (in FIG. 2) determines that the duration of the driver carelessness state is greater than the calculated driver carelessness state determination time (S806c), the controller 106 (in FIG. 2) may further transmit a warning command to the warning apparatus 30 (in FIG. 2) so as to warn the driver of the warning operation of the warning apparatus 30 (in FIG. 2) (S806d).

Figure 9:
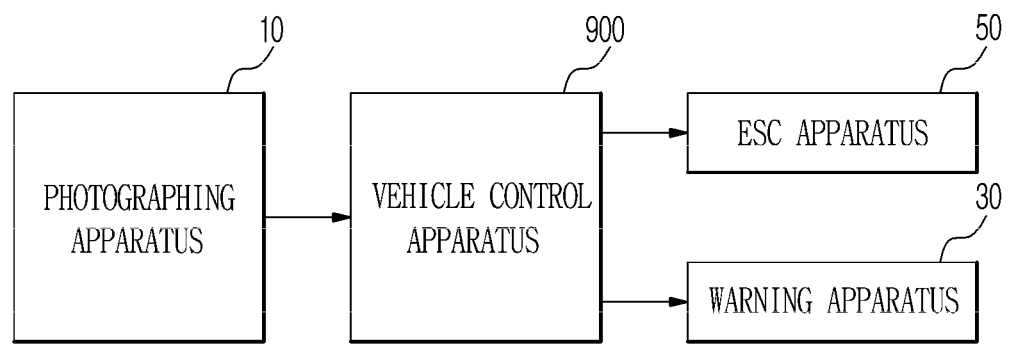
FIG. 9 is a block diagram illustrating a state in which a vehicle control apparatus according to an embodiment of the present disclosure is connected to a photographing apparatus, a warning apparatus and an ESC apparatus.
Figure 10:
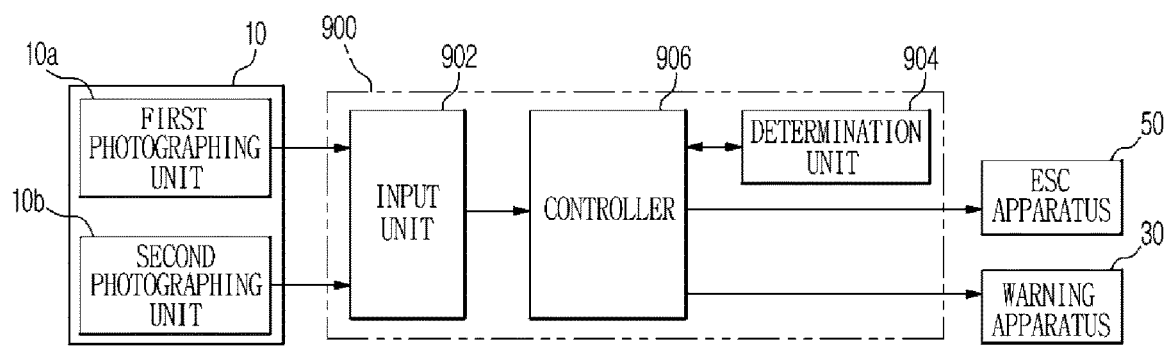
FIG. 10 is a block diagram illustrating an example of the photographing apparatus and the vehicle control apparatus shown in FIG. 9.

FIG. 9 is a block diagram illustrating a state in which a vehicle control apparatus according to an embodiment of the present disclosure is connected to a photographing apparatus, a warning apparatus and an ESC apparatus, and FIG. 10 is a block diagram illustrating an example of the photographing apparatus and the vehicle control apparatus shown in FIG. 9.

Referring to FIGS. 9 and 10, a vehicle control apparatus 900 according to an embodiment of the present disclosure includes an input unit 902, a determination unit 904, and a controller 906 in the same manner as the vehicle control apparatus 100 (in FIG. 2).

The functions of the components of the vehicle control apparatus 900 according to an embodiment of the present disclosure and the connection relationship between them are the same as the functions of the components of the vehicle control device 100 (in FIG. 2) and the connection relationship between them. Therefore, an additional explanation therefor will be omitted.

The controller 906 of the vehicle control apparatus 900 according to an embodiment of the present disclosure may further transmit a vehicle attitude control command to an electronic stability control (ESC) apparatus 50 so that the ESC apparatus 50 controls the vehicle attitude in accordance with the lane if the determination unit 904 determines that the vehicle is in an inappropriate driving pattern and the driver is in a driver carelessness state.

Figure 11:
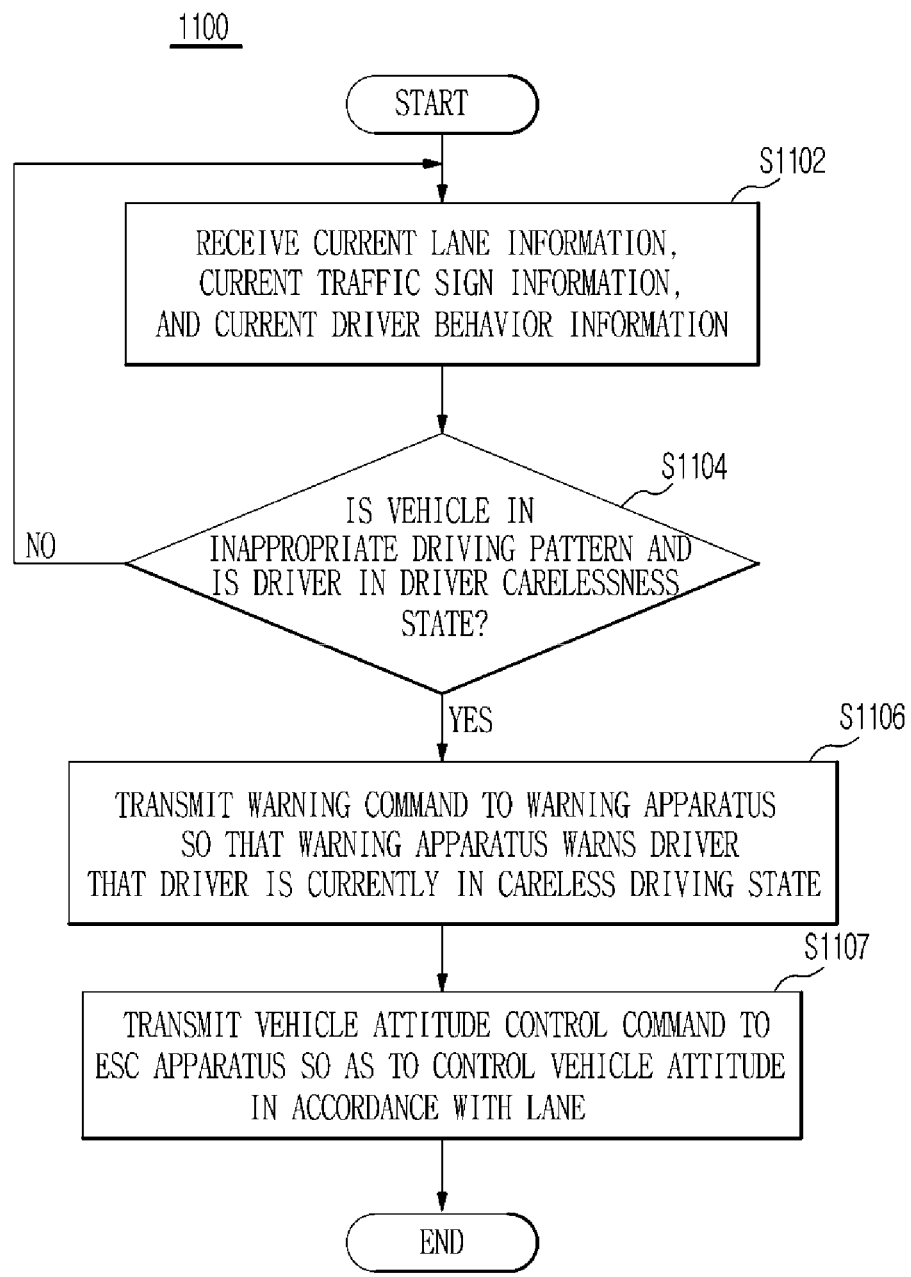
FIG. 11 is a flowchart illustrating another example of a vehicle control method of a vehicle control apparatus according to an embodiment of the present disclosure.

FIG. 11 is a flowchart illustrating another example of a vehicle control method of a vehicle control apparatus according to an embodiment of the present disclosure.

Referring to FIG. 11, a vehicle control method 1100 of the vehicle control apparatus 900 (in FIGS. 9 and 10) according to an embodiment of the present disclosure includes a first step S1102, a second step S1104, and a third step S1106 in the same manner as the vehicle control method 700 (in FIG. 7) of the vehicle control apparatus 100 (in FIGS. 1 and 2).

The functions of the respective steps of the vehicle control method 1100 of the vehicle control apparatus 900 (in FIGS. 9 and 10) according to an embodiment of the present disclosure and the connection relationship between them are the same as the functions of the respective steps of the vehicle control method 700 (in FIG. 7) of the vehicle control apparatus 100 (in FIGS. 1 and 2) and the connection relationship between them. Therefore, an additional explanation therefor will be omitted.

The vehicle control method 1100 of the vehicle control apparatus 900 (in FIGS. 9 and 11) according to an embodiment of the present disclosure further includes a fourth step S1107.

As an example, the fourth step S1107 may be performed after the third step S1106.

As another example, the fourth step S1107, although not shown, may be performed after the second step S1104 and before the third step S1106.

As still another example, the fourth step S1107, although not shown, may be performed in synchronization with the third step S1106.

In the fourth step S1107, if the determination unit 904 (in FIG. 9) determines that the vehicle is in an inappropriate driving pattern and the driver is in a driver carelessness state, the controller 906 (in FIG. 9) may further transmit a vehicle attitude control command to the ESC apparatus 50 (in FIG. 9) so that the ESC apparatus 50 (in FIG. 9) controls the vehicle attitude in accordance with the lane.

Figure 12:
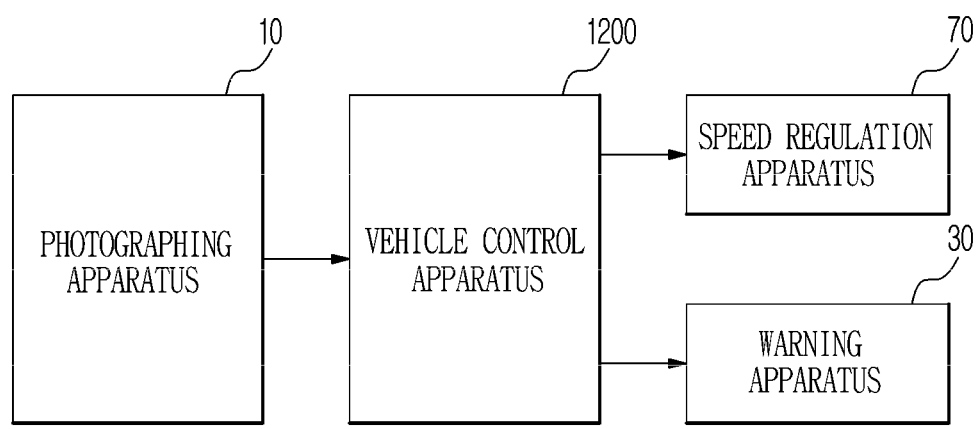
FIG. 12 is a block diagram illustrating a state in which a vehicle control apparatus according to an embodiment of the present disclosure is connected to a photographing apparatus, a warning apparatus and a speed regulation apparatus.
Figure 13:
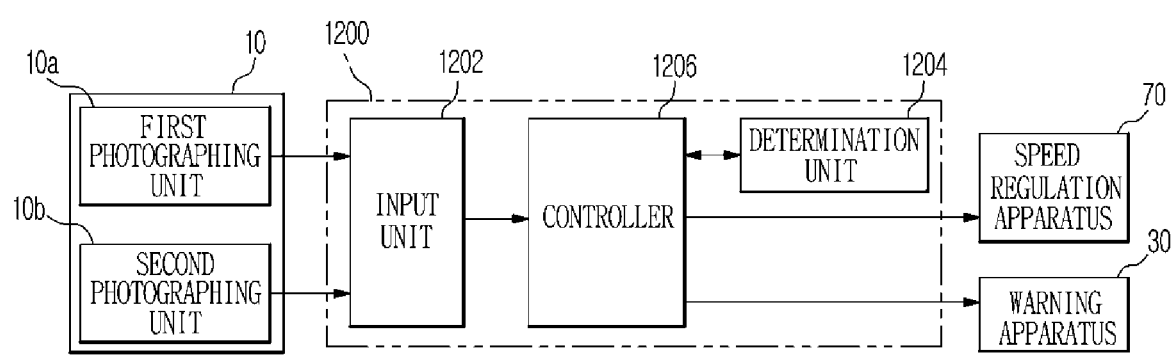
FIG. 13 is a block diagram illustrating an example of the photographing apparatus and the vehicle control apparatus shown in FIG. 12.

FIG. 12 is a block diagram illustrating a state in which a vehicle control apparatus according to an embodiment of the present disclosure is connected to a photographing apparatus, a warning apparatus and a speed regulation apparatus, and FIG. 13 is a block diagram illustrating an example of the photographing apparatus and the vehicle control apparatus shown in FIG. 12.

Referring to FIGS. 12 and 13, a vehicle control apparatus 1200 according to an embodiment of the present disclosure includes an input unit 1202, a determination unit 1204, and a controller 1206 in the same manner as the vehicle control apparatus 100 (in FIG. 2).

The functions of the components of the vehicle control apparatus 1200 according to an embodiment of the present disclosure and the connection relationship between them are the same as the functions of the components of the vehicle control device 100 (in FIG. 2) and the connection relationship between them. Therefore, an additional explanation therefor will be omitted.

The controller 1206 of the vehicle control apparatus 1200 according to an embodiment of the present disclosure may further transmit a speed regulation command to a speed regulation apparatus 70 so that the speed regulation apparatus 70 regulates the speed in accordance with a target speed if the determination unit 1204 determines that the vehicle is in an inappropriate driving pattern and the driver is in a driver carelessness state.

As an example, if the determination unit 1204 determines that the vehicle is in the inappropriate driving pattern and the driver is in the driver carelessness state, the controller 1206 may further transmit a speed regulation command to the speed regulation apparatus 70 so that the speed regulation apparatus 70 increases or decreases the speed in accordance with the set target speed for preventing a collision with another vehicle while increasing the speed in consideration of the distance from the another vehicle.

In addition, if the determination unit 1204 determines that the vehicle is in an inappropriate driving pattern and the driver is in a driver carelessness state, the controller 1206 of the vehicle control apparatus 1200 according to an embodiment of the present disclosure may further transmit a speed regulation command to the speed regulation apparatus 70 so that the speed regulation apparatus 70 regulates the speed in accordance with a regulation speed of the inputted current traffic sign information.

As an example, if the determination unit 1204 determines that the vehicle is in an inappropriate driving pattern and the driver is in a driver carelessness state, the controller 1206 of the vehicle control apparatus 1200 according to an embodiment of the present disclosure may further transmit a speed regulation command to the speed regulation apparatus 70 so that the speed regulation apparatus 70 lowers the speed to 50 km/h, which is the regulation speed of the inputted current traffic sign information.

Figure 14:
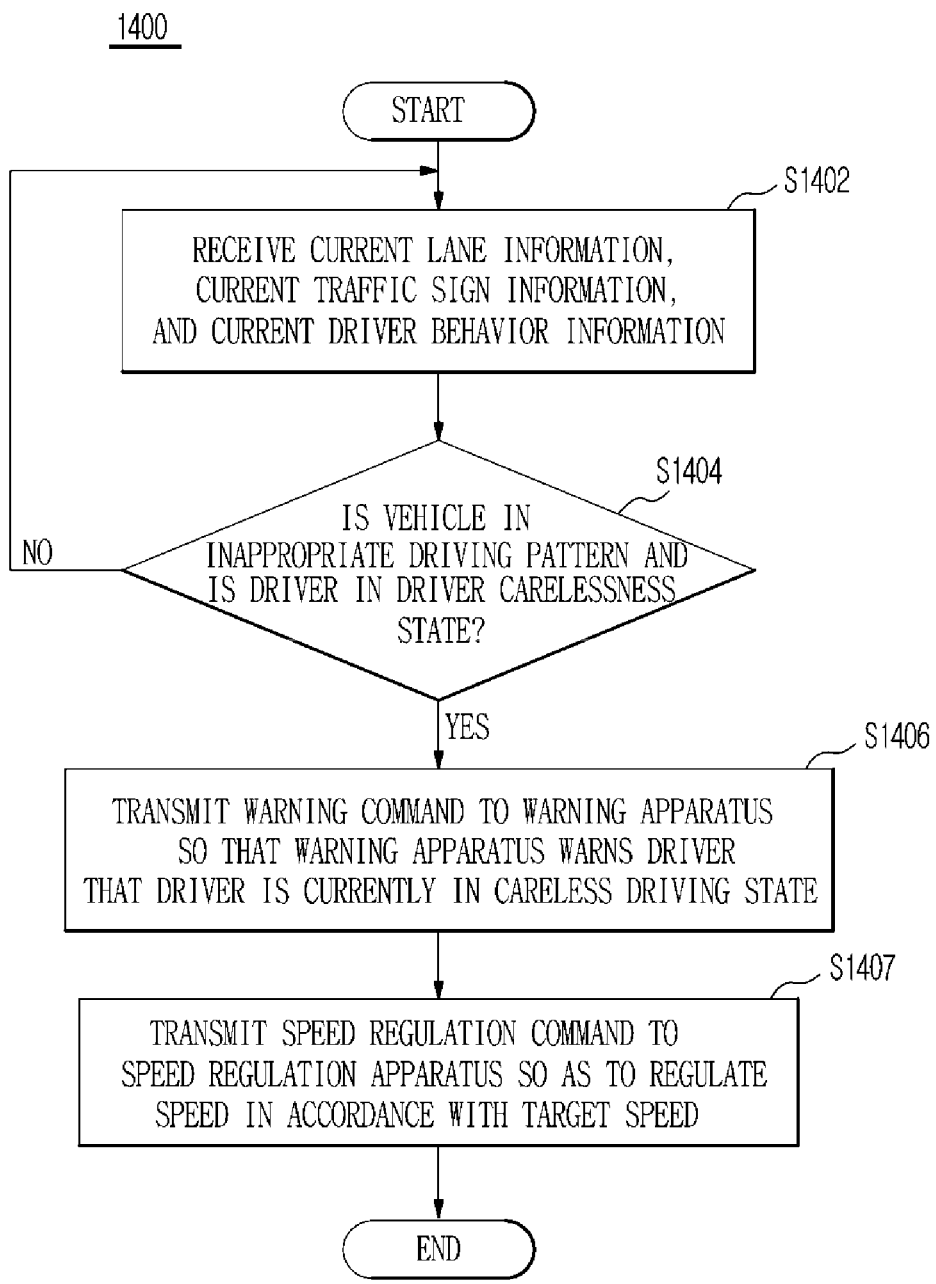
FIG. 14 is a flowchart illustrating still another example of a vehicle control method of a vehicle control apparatus according to an embodiment of the present disclosure.
Figure 15:
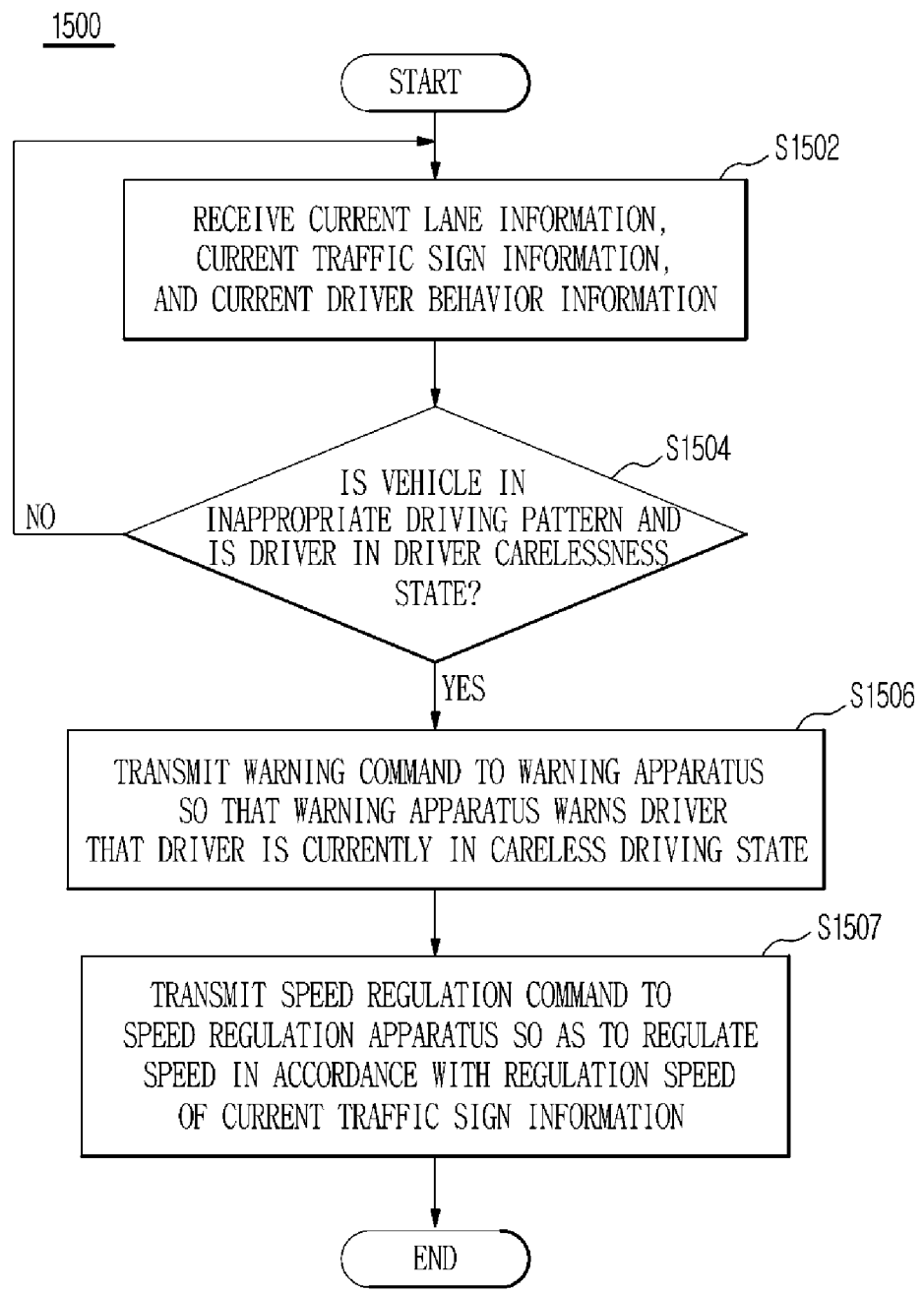
FIG. 15 is a flowchart illustrating still another example of a vehicle control method of a vehicle control apparatus according to an embodiment of the present disclosure.

FIG. 14 is a flowchart illustrating still another example of a vehicle control method of a vehicle control apparatus according to an embodiment of the present disclosure, and FIG. 15 is a flowchart illustrating still another example of a vehicle control method of a vehicle control apparatus according to an embodiment of the present disclosure.

Referring to FIGS. 14 and 15, vehicle control methods 1400 and 1500 of the vehicle control apparatus 1200 (in FIGS. 12 and 13) according to an embodiment of the present disclosure include first steps S1402 and S1502, second steps S1404 and S1504, and third steps S1406 and S1506 in the same manner as the vehicle control method 700 (in FIG. 7) of the vehicle control apparatus 100 (in FIGS. 1 and 2).

The functions of the respective steps of the vehicle control methods 1400 and 1500 of the vehicle control apparatus 1200 (in FIGS. 12 and 13) according to an embodiment of the present disclosure and the connection relationship between them are the same as the functions of the respective steps of the vehicle control method 700 (in FIG. 7) of the vehicle control apparatus 100 (in FIGS. 1 and 2) and the connection relationship between them. Therefore, an additional explanation therefor will be omitted.

The vehicle control methods 1400 and 1500 of the vehicle control apparatus 1200 (in FIGS. 12 and 13) according to an embodiment of the present disclosure further include a fifth step S1407 and a sixth step S1507.

As an example, the fifth step S1407 and the sixth step S1507 may be performed after the third steps S1406 and S1506.

As another example, the fifth step S1407 and the sixth step S1507, although not shown, may be performed after the second steps S1404 and S1504 and before the third steps S1406 and S1506.

As still another example, the fifth step S1407 and the sixth step S1507, although not shown, may be performed in synchronization with the third steps S1406 and S1506.

In the fifth step S1407, if the determination unit 1204 (in FIG. 13) determines that a vehicle is in an inappropriate driving pattern and a driver is in a driver carelessness state, the controller 1206 (in FIG. 13) may further transmit a speed regulation command to the speed regulation apparatus 70 (in FIG. 13) so that the speed regulation apparatus 70 (in FIG. 13) regulates the speed in accordance with a target speed.

In addition, in the sixth step S1507, if the determination unit 1204 (in FIG. 13) determines that a vehicle is in an inappropriate driving pattern and a driver is in a driver carelessness state, the controller 1206 (in FIG. 13) may further transmit a speed regulation command to the speed regulation apparatus 70 (in FIG. 13) so that the speed regulation apparatus 70 (in FIG. 13) regulates the speed in accordance with a regulation speed of the inputted current traffic sign information.

As such, the vehicle control apparatuses 100, 900 and 1200 and the vehicle control methods 700, 1100, 1400 and 1500 according to an embodiment of the present disclosure can perform the first steps S702, S1102, S1402 and S1502, the second steps S704. S1104, S1404 and S1504, and the third steps S706, S1106, S1406 and S1506 by including the input units 102, 902 and 1202, the determination units 104, 904 and 1204, and the controllers 106, 906 and 1206.

Accordingly, the vehicle control apparatuses 100, 900 and 1200 and the vehicle control methods 700, 1100, 1400 and 1500 according to an embodiment of the present disclosure can warn the driver that the driver is currently in a careless driving state through the warning apparatus 30 if a vehicle is in an inappropriate driving pattern and the driver is in a driver carelessness state.

Therefore, the vehicle control apparatuses 100, 900 and 1200 and the vehicle control methods 700, 1100, 1400 and 1500 according to an embodiment of the present disclosure can efficiently improve the warning operation of the warning apparatus 30.

In addition, the vehicle control apparatus 100 and the vehicle control method 800 according to an embodiment of the present disclosure can perform the first step S802, the second step S804, and the third steps S806a to S806d by including the input unit 102, the determination unit 104, and the controller 106.

Accordingly, the vehicle control apparatus 100 and the vehicle control method 800 according to an embodiment of the present disclosure can variably calculate a driver carelessness state determination time for performing the warning operation of the warning apparatus 30 according to the inappropriate driving pattern and the driver carelessness state.

Therefore, the vehicle control apparatus 100 and the vehicle control method 800 according to an embodiment of the present disclosure can reduce a false warning rate due to the quick warning operation or the late warning operation while warning through the warning apparatus 30 that a driver is currently in a careless driving state within a proper time.

In addition, the vehicle control apparatus 900 and the vehicle control method 1100 according to an embodiment of the present disclosure can perform the first step S1102, the second step S1104, the third step S1106 and the fourth step S1107 by including the input unit 902, the determination unit 904, and the controller 906.

Accordingly, the vehicle control apparatus 900 and the vehicle control method 1100 according to an embodiment of the present disclosure can control a vehicle attitude in accordance with the lane through the ESC apparatus 50.

Therefore, the vehicle control apparatus 900 and the vehicle control method 1100 according to an embodiment of the present disclosure can control the vehicle attitude so that a vehicle does not depart from the lane, thereby effectively preventing the occurrence of a traffic accident in advance.

In addition, the vehicle control apparatus 1200 and the vehicle control methods 1400 and 1500 according to an embodiment of the present disclosure can perform the first steps S1402 and S1502, the second steps S1404 and S1504, the third steps S1406 and S1506, the fifth step S1407 and the sixth step S1507 by including the input unit 1202, the determination unit 1204, and the controller 1206.

Accordingly, the vehicle control apparatus 1200 and the vehicle control methods 1400 and 1500 according to an embodiment of the present disclosure, when a vehicle is in an inappropriate driving pattern and a driver is in a driver carelessness state, can regulate the speed in accordance with a target speed through the speed regulation apparatus 70, and can regulate the speed in accordance with a regulation speed of the current traffic sign information through the speed regulation apparatus 70.

Therefore, the vehicle control apparatus 1200 and the vehicle control methods 1400 and 1500 according to an embodiment of the present disclosure can stably control the speed of a vehicle, thereby effectively preventing the occurrence of a traffic accident in advance.

As is apparent from the above, the vehicle control apparatuses and the vehicle control methods according to an embodiment of the present disclosure can efficiently improve the warning operation of a warning apparatus.

Further, the vehicle control apparatuses and the vehicle control methods according to an embodiment of the present disclosure can reduce a false warning rate while warning that a driver is currently in a careless driving state within a proper time.

Further, the vehicle control apparatuses and the vehicle control methods according to an embodiment of the present disclosure can effectively prevent the occurrence of a traffic accident in advance.

What is claimed is:

1. A vehicle control apparatus comprising:
an input unit configured to receive current lane information, current traffic sign information, and current driver behavior information photographed by a photographing apparatus;
a determination unit configured to determine whether a vehicle s in an inappropriate driving pattern based on the inputted current lane information and the current traffic sign information and to determine whether a driver is in a driver carelessness state based on the inputted current driver behavior information; and
a controller configured to:
transmit a warning command to a warning apparatus so that the warning apparatus warns the driver that the driver is currently in the driver careless state when the vehicle is in the inappropriate driving pattern and a duration of the driver carelessness state is greater than a driver carelessness state determination time, and
count a frequency of occurrence of the inappropriate driving pattern for a predetermined time when the vehicle is in a state in which the inappropriate driving pattern has started to occur, and change the driver carelessness state determination time for performing a warning operation of the warning apparatus according to the frequency of occurrence of the inappropriate driving pattern for the predetermined time.

2. The vehicle control apparatus according to claim 1, wherein the driver carelessness state determination time is calculated using an initial driver carelessness state determination time set to an initial default value of the controller, a first weighted value applied in correspondence with the frequency of occurrence of the inappropriate driving pattern for the predetermined time, and a second weighted value applied in correspondence with the frequency of warning occurrence of the warning apparatus for the predetermined time.

3. The vehicle control apparatus according to claim 1, wherein the controller is configured to transmit a vehicle attitude control command to an electronic stability control (ESC) apparatus so that the ESC apparatus controls the vehicle attitude in accordance with the lane if the vehicle is in the inappropriate driving pattern and the driver is in the driver carelessness state.

4. The vehicle control apparatus according to claim 1, wherein the controller is configured to transmit a speed regulation command to a speed regulation apparatus so that the speed regulation apparatus regulates the speed in accordance with a target speed if the vehicle is in the inappropriate driving pattern and the driver is in the driver carelessness state.

5. The vehicle control apparatus according to claim 1, wherein the controller is configured to transmit a speed regulation command to a speed regulation apparatus so that the speed regulation apparatus regulates the speed in accordance with a regulation speed of the inputted current traffic sign information if the vehicle is in the inappropriate driving pattern and the driver is in the driver carelessness state.

6. A vehicle control method comprising:
receiving current lane information, current traffic sign information, and current driver behavior information photographed by a photographing apparatus;
determining whether a vehicle is in an inappropriate driving pattern based on the inputted current lane information and the current traffic sign information and determining whether a driver is in a driver carelessness state based on the inputted current driver behavior information;
transmitting a warning command to a warning apparatus so that the warning apparatus warns the driver that the driver is currently in the driver careless state when the vehicle is in the inappropriate driving pattern and a duration of the driver carelessness state is greater than a driver carelessness state determination time; and
counting a frequency of occurrence of the inappropriate driving pattern for a predetermined time when the vehicle is in a state in which the inappropriate driving pattern has started to occur, and changing the driver carelessness state determination time for performing a warning operation of the warning apparatus according to the frequency of occurrence of the inappropriate driving pattern for the predetermined time.

7. The vehicle control method according to claim 6, wherein the driver carelessness state determination time is calculated using an initial driver carelessness state determination time set to an initial default value, a first weighted value applied in correspondence with the frequency of occurrence of the inappropriate driving pattern for the predetermined time, and a second weighted value applied in correspondence with the frequency of warning occurrence of the warning apparatus for the predetermined time.

8. The vehicle control method according to claim 6, further comprising transmitting a vehicle attitude control command to an electronic stability control (ESC) apparatus so that the ESC apparatus controls the vehicle attitude in accordance with the lane if the vehicle is in the inappropriate driving pattern and the driver is in the driver carelessness state.

9. The vehicle control method according to claim 6, further comprising transmitting a speed regulation command to a speed regulation apparatus so that the speed regulation apparatus regulates the speed in accordance with a target speed if the vehicle is in the inappropriate driving pattern and the driver is in the driver carelessness state.

10. The vehicle control method according to claim 6, further comprising transmitting a speed regulation command to a speed regulation apparatus so that the speed regulation apparatus regulates the speed in accordance with a regulation speed of the inputted current traffic sign information if the vehicle is in the inappropriate driving pattern and the driver is in the driver carelessness state.

\* \* \* \* \*